United States Patent [19]
Smith et al.

[11] Patent Number: 5,979,183
[45] Date of Patent: Nov. 9, 1999

[54] HIGH AVAILABILITY GAS TURBINE DRIVE FOR AN AIR SEPARATION UNIT

[75] Inventors: Arthur Ramsden Smith, Telford; Donald Winston Woodward, New Tripoli, both of Pa.

[73] Assignee: Air Products and Chemicals, Inc., Allentown, Pa.

[21] Appl. No.: 09/083,219

[22] Filed: May 22, 1998

[51] Int. Cl.⁶ .................................................... F25J 3/00
[52] U.S. Cl. ............................. 62/650; 62/915; 60/39.12
[58] Field of Search ........................... 62/643, 915, 650; 60/39.12

[56] References Cited

U.S. PATENT DOCUMENTS

| | | | |
|---|---|---|---|
| 2,268,270 | 12/1941 | Traupel | 60/41 |
| 3,731,495 | 5/1973 | Coveney | 62/39 |
| 3,871,172 | 3/1975 | Villiers-Fisher et al. | 60/39.02 |

(List continued on next page.)

FOREIGN PATENT DOCUMENTS 1455960  11/1976  United Kingdom .

OTHER PUBLICATIONS

*The Mechanical Engineer's Handbook,* Edited by M. Kutz, John Wiley & Sons, Inc., 1986, Chapter 72, pp. 1984–2009.
*Marks' Standard Handbook for Mechanical Engineers,* Edited by E. A. Avallone and T. Baumeister III, McGraw–Hill Book Co., New York, Ninth Edition (1987), pp. 9–118 to 9–123.
Todd, D. M., "Clean Coal Technologies for Gas Turbines", presented at GE Turbine State–of–the–Art Technology Seminar, Jul. 1993, pp. 1–18.
Rao, A. D. et al., "Integration of Texaco TQ Gasification with Elevated Pressure ASU", presented at 13ᵗʰ EPRI Conference on Gasification Power Plants, San Francisco, CA, Oct. 19–21, 1994.

Smith, A. R. et al., "Improved IGCC Power Output and Economics Incorporating a Supplementary Gas Turbine", presented at the 13ᵗʰ EPRI Conference on Gasification Power Plants, San Francisco, CA, Oct. 19–21, 1994.

Coproduction of Power, Steam, and Oxygen in Coal or Low Quality Fuel Combustion systems in *Research Disclosure,* Mar. 1995, pp. 181–186.

Fernald, E. M., "An Exploratory Excursion Into Gas–Turbine Patents", *Mechanical Engineering,* Aug., 1946, pp. 727–732.

Klara, J. M., "HIPPS: beyond state–of–the–art" Part I, *Power Engineering,* Dec. 1993, pp. 37–39.

Smith, A. R., et al., "Integration of Oxygen Plants and Gas Turbines in IGCC Facilities", Presented at the American Power Conference, Apr. 19, 1996 in Chicago, IL.

*Primary Examiner*—Ronald Capossela
*Attorney, Agent, or Firm*—John M. Fernbacher

[57] ABSTRACT

Oxygen is produced by compressing air to provide a first and a second pressurized air stream, separating the first pressurized air stream into an oxygen-rich product stream and a nitrogen-rich byproduct stream, and combining the nitrogen-rich byproduct stream with the second pressurized air stream. The resulting combined stream is heated by indirect heat exchange with a hot process stream and is work expanded in a gas turbine expander. At least a portion of the expander shaft work is utilized for the air compression step. Fuel is combusted with the expander discharge stream to provide the hot process stream for heating the combined stream prior to expansion. The use of this integrated indirectly-fired gas turbine to provide pressurized feed air for the air separation system improves the availability and reliability of the integrated system compared with conventional directly-fired gas turbine systems.

19 Claims, 7 Drawing Sheets

U.S. PATENT DOCUMENTS

| | | | |
|---|---|---|---|
| 3,950,957 | 4/1976 | Zakon | 62/30 |
| 4,019,314 | 4/1977 | Springmann | 60/39.02 |
| 4,049,299 | 9/1977 | Rigollot | 290/52 |
| 4,250,704 | 2/1981 | Bruckner et al. | 60/39.12 |
| 4,545,787 | 10/1985 | Hegarty | 55/16 |
| 4,697,415 | 10/1987 | Schiffers | 60/39.12 |
| 4,785,621 | 11/1988 | Alderson et al. | 60/39.12 |
| 5,035,727 | 7/1991 | Chen | 55/16 |
| 5,081,845 | 1/1992 | Allam et al. | 62/24 |
| 5,406,786 | 4/1995 | Scharpf et al. | 60/39.02 |
| 5,459,994 | 10/1995 | Drnevich | 62/915 |
| 5,501,078 | 3/1996 | Paolino | 60/39.12 |
| 5,516,359 | 5/1996 | Kang et al. | 95/14 |
| 5,562,754 | 10/1996 | Kang et al. | 95/54 |
| 5,565,017 | 10/1996 | Kang et al. | 95/14 |
| 5,643,354 | 7/1997 | Agrawal | 75/490 |
| 5,657,624 | 8/1997 | Kang et al. | 60/39.02 |
| 5,666,823 | 9/1997 | Smith et al. | 62/653 |
| 5,740,673 | 4/1998 | Smith et al. | 60/39.02 |

HIGH AVAILABILITY GAS TURBINE DRIVE FOR AN AIR SEPARATION UNIT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Gas turbine systems provide shaft work by the expansion of hot pressurized gas streams produced directly or indirectly by the combustion of solid, liquid, or gaseous fuels. A gas turbine system utilizes one or more air compressors mechanically linked with one or more turboexpanders to provide shaft work for transportation, power generation, industrial processes, and many other well-known applications.

Gas turbine systems known in the art can be classified as directly-fired, indirectly-fired, or combination systems. In a directly-fired gas turbine system, compressed air is combusted with a fuel, typically a gas or light hydrocarbon liquid, and the hot pressurized combustion gases are expanded directly in the turboexpander. Additional work can be recovered from the hot turboexpander exhaust, for example by generating steam for expansion in a steam turbine. Directly-fired gas turbine systems are open systems in which the turboexpander working fluid (i.e. combustion products) is discharged to the atmosphere after appropriate heat recovery.

In an indirectly-fired gas turbine system, a working fluid (typically air) is compressed in the gas turbine compressor, heated by indirect heat exchange with a hot external gas stream (typically obtained by the combustion of a solid, liquid, or gaseous fuel) to yield hot pressurized air, and expanded in the turboexpander to generate shaft work. The turboexpander exhaust may be used to preheat the combustion air or may be introduced directly into the combustion step. Indirectly-fired gas turbines can be operated in a closed cycle wherein a recirculating gaseous working fluid is compressed, heated, expanded, and cooled using a totally integrated compressor and turboexpander.

Combined gas turbine systems are known in the art in which a directly-fired gas turbine is integrated with an indirectly-fired gas turbine. In such systems the indirectly-fired gas turbine may be a partially-closed system in which a major portion of the indirectly-fired turbine exhaust is cooled and recycled to the compressor.

The types of gas turbine systems summarized above are described in detail in standard textbooks such as *The Mechanical Engineer's Handbook,* Edited by M. Kurtz, John Wiley & Sons, Inc, 1986, Chapter 72, pp. 1984–2009 and *Marks' Standard Handbook for Mechanical Engineers,* edited by E. A. Avallone and T. Baumeister III, McGraw-Hill Book Co., New York, Ninth Edition (1987), pp. 9–118 to 9–123.

The separation of air into its components is accomplished by compressing air, pretreating the compressed air as necessary to remove certain contaminants, and separating the purified compressed air by known methods of cryogenic distillation, pressure swing adsorption, permeable polymeric membranes, or high temperature ceramic mixed conductor membranes. Power for compressing the air can be provided by electric motors, gas or steam turbines, or combinations of electric motors and gas or steam turbine drivers. Compressor driver selection is dictated by numerous design factors such as the type of air separation process, size of the process plant, location, electricity cost, fuel availability, and potential for integration of the air separation process with the compressor driver. In addition, the air separation system and compressor driver may be integrated with a process utilizing the product(s) of the air separation process.

A gas turbine is the preferred compressor driver in a number of air separation processes. One of these is the integrated gasification combined cycle (IGCC) process in which coal or other carbonaceous material is gasified with oxygen and the produced gas is cleaned to yield a low-sulfur fuel gas. This fuel gas is utilized in a direct-fired gas turbine which drives a generator to produce electric power with reduced environmental emissions. The oxygen is produced by cryogenic air separation wherein some or all of the compressed air feed may be provided by the gas turbine compressor, and the nitrogen-rich byproduct gas from the air separation system is compressed and introduced into the gas turbine combustor.

A general review of the current art in IGCC power generation systems is given by D. M. Todd in an article entitled "Clean Coal Technologies for Gas Turbines" presented at the GE Turbine State-of-the-Art Technology Seminar, July 1993, pp. 1–18. A review of various integration techniques and the impact thereof on GCC economics is given in a paper by A. D. Rao et al entitled "Integration of Texaco TQ Gasification with Elevated Pressure ASU" presented at the 13$^{th}$ EPRI Conference on Gasification Power Plants, San Francisco, Calif., Oct. 19–21, 1994. In a paper entitled "Improved IGCC Power Output and Economics Incorporating a Supplementary Gas Turbine" presented at the 13th EPRI Conference on Gasification Power Plants, San Francisco, Calif., Oct. 19–21, 1994, A. R. Smith et al review several modes of integration between the gas turbine and the air separation unit in an IGCC process.

The utilization of the nitrogen-rich byproduct stream by compression and injection into the combustor of an IGCC system is described in representative U.S. Pat. Nos. 4,250,704; 4,697,415; 5,081,845; 5,406,786; and 5,740,673. Another method of utilizing the nitrogen-rich waste stream in an integrated air separation/gas turbine system is described in U.S Pat. Nos. 3,731,495; 4,019,314; and 5,406,786 wherein this stream is optionally heated and introduced directly into the gas turbine expander without prior compression.

The use of an indirectly-fired gas turbine with a cryogenic air separation system is described in Great Britain Patent Specification 1 455 960. An air separation unit is integrated with a steam generation system in which a nitrogen-rich waste stream is heated by indirect heat exchange with hot compressed air from the air separation unit main air compressor, the heated nitrogen-rich stream is further heated indirectly in a fired heater, and the final hot nitrogen-rich stream is work expanded in a dedicated nitrogen expansion turbine. The work generated by this expansion turbine drives the air separation unit main air compressor. The nitrogen expansion turbine exhaust and the combustion gases from the fired heater are introduced separately into a fired steam generator to raise steam, a portion of which may be expanded in a steam turbine to drive the air separation unit main air compressor. Cooled nitrogen is withdrawn from the steam generator and may be used elsewhere if desired. Optionally, the combustion gases from the fired heater are expanded in a turbine which drives a compressor to provide combustion air to a separate fired heater which heats the nitrogen-rich stream prior to expansion. In another option, the nitrogen expansion turbine exhaust and the combustion gases from the fired heater are combined and introduced into the economizer and air preheater sections of the fired steam generator.

An indirectly-fired gas turbine IGCC system is described in U.S. Pat. No. 4,785,621 wherein the fuel gas from the gasifier is introduced into a directly-fired gas turbine which generates power. A separate indirectly-fired gas turbine system provides extracted air for the air separation system, the exhaust gas from the directly-fired gas turbine expander heats compressed air by indirect heat exchange, and the heated compressed air is expanded in the indirectly-fired gas turbine expander. Nitrogen-rich waste gas from the air separation system is mixed with the compressed air before the indirect heating and expansion steps. Exhaust from the indirectly-fired gas turbine expander is discharged to the atmosphere or used for supplemental heat recovery.

Gas turbines are the preferred drivers in processes to separate air at high temperatures in ceramic mixed conductor membrane systems. Directly-fired gas turbines for this application are described in U.S. Pat. Nos. 4,545,787; 5,516,359; 5,562,754; 5,565,017; and 5,657,624. A directly-fired gas turbine is utilized with a ceramic mixed conductor membrane air separation system which provides oxygen to a direct reduction iron recovery process as described in U.S. Pat. No. 5,643,354. Indirectly-fired gas turbines for this application are described in U.S. Pat. No. 5,035,727 and in an article entitled "Coproduction of Power, Steam, and Oxygen in Coal or Low Quality Fuel Combustion Systems" in *Research Disclosure,* March 1995, pp. 181–186.

The turboexpander of a directly-fired gas turbine generally requires more maintenance and has a lower onstream operating availability than the turboexpander of an indirectly-fired gas turbine. This occurs because the motive gas in the directly-fired gas turbine contains combustion products including water, carbon dioxide, sulfur compounds, and particulates, and these byproducts can cause fouling, erosion, and corrosion of the turboexpander internals thereby decreasing operating availability. The motive gas in an indirectly-fired gas turbine, on the other hand, contains no combustion products and the turboexpander therefore will operate with reduced fouling, erosion, and corrosion problems and will have a higher operating availability. This advantage of an indirectly-fired gas turbine is offset by the requirement for a high temperature nonrecuperative type of gas-gas heat exchanger to heat the motive gas before expansion, which is not required in a directly-fired gas turbine. The higher operating availability of the indirectly-fired gas turbine, however, may make it an attractive driver choice in certain applications.

The present invention discloses the use of an indirectly-fired gas turbine system to provide compressed air feed for an air separation system in applications where high driver availability is required. The invention utilizes the integration of an indirectly-fired gas turbine with the air separation system for the production of oxygen with efficient utilization of the nitrogen-rich byproduct.

BRIEF SUMMARY OF THE INVENTION

The invention is a method for the production of oxygen which comprises compressing air to provide a first and a second pressurized air stream, separating the first pressurized air stream into an oxygen-rich product stream and a nitrogen-rich byproduct stream, and combining the nitrogen-rich byproduct stream with the second pressurized air stream. The resulting combined stream is heated by indirect heat exchange with a hot process stream to provide a hot pressurized gas stream which is work expanded to produce shaft work and a reduced-pressure expander discharge stream. The hot process stream typically is provided by combusting a fuel with the reduced-pressure expander discharge stream in a combustor, and air can be added to the reduced-pressure expander discharge stream prior to combustion if necessary. At least a portion of the shaft work is utilized for compressing the air to provide the first and a second pressurized air streams.

The first and a second pressurized air streams can be provided by compressing air and dividing the resulting compressed air stream into the first and a second pressurized air streams. Alternatively, the first and second pressurized air streams can be obtained by compressing air in a multiple-stage air compressor, withdrawing compressed air from a final stage of the compressor to provide the first pressurized air stream, and withdrawing compressed air from an intermediate stage of the compressor to provide the second pressurized air stream. Alternatively, the first and second pressurized air streams can be obtained by compressing air in a first air compressor to provide the first pressurized air stream and compressing air in a second air compressor to provide the second pressurized air stream.

The oxygen-rich product stream can be utilized to gasify a carbonaceous feedstock to produce synthesis gas comprising hydrogen and carbon monoxide, and a portion of the synthesis gas may provide at least a portion of the fuel for the combustor.

Separation of the first pressurized air stream into an oxygen-rich product stream and a nitrogen-rich byproduct stream can be accomplished by cryogenic distillation. The nitrogen-rich byproduct stream can be compressed before combining with the second pressurized air stream. Optionally, a portion of the shaft work generated in the work expansion of the hot pressurized gas stream can be utilized to produce electric power.

An alternative embodiment of the invention comprises compressing air and dividing the resulting compressed air into a first and a second pressurized air streams, separating the first pressurized air stream into an oxygen-rich product stream and a nitrogen-rich byproduct stream, and heating the second pressurized air stream by indirect heat exchange with a hot process stream. The hot process stream is work expanded to produce shaft work and a reduced-pressure expander discharge stream. The nitrogen-rich byproduct stream is heated by indirect heat exchange with a hot process stream and work expanded produce additional shaft work. At least a portion of the shaft work generated by either or both of these expansion steps provides work for compressing the air. Heating of the nitrogen-rich byproduct stream and the second pressurized air stream can be accomplished by common indirect heat exchange with the hot process stream. The hot process stream can be provided by combusting a fuel in a combustor with the reduced-pressure expander discharge stream, and if necessary air can be added to the reduced-pressure expander discharge stream prior to combustion.

The oxygen-rich product stream can be utilized to gasify a carbonaceous feedstock to produce synthesis gas comprising hydrogen and carbon monoxide, and if desired a portion of the synthesis gas can be used as fuel for the gas turbine combustor.

The separation of the first pressurized air stream into an oxygen-rich product stream and a nitrogen-rich byproduct stream is accomplished by cryogenic distillation, and the nitrogen-rich byproduct stream can be compressed before combining with the second pressurized air stream. A portion of the shaft work can be utilized to produce electric power. Natural gas or other fuels can be used alone or in combination with synthesis gas as combustor fuel for the gas turbine combustor.

DETAILED DESCRIPTION OF THE INVENTION

A gas turbine is the preferred compressor driver for the air separation unit of an integrated gasification combined cycle (IGCC) process in which coal or other carbonaceous material is gasified with oxygen and the produced gas is cleaned to yield a low-sulfur fuel gas. This fuel gas is utilized in a direct-fired gas turbine which drives a generator to produce electric power with reduced environmental emissions. The oxygen is produced by cryogenic air separation wherein some or all of the compressed air feed is provided by the gas turbine compressor, and the nitrogen-rich waste gas from the air separation system is compressed and introduced into the gas turbine combustor.

In recent years gas turbines have become very energy efficient, approaching 60% for combined cycles burning natural gas. This has been accomplished by the use of superior materials and coatings allowing higher firing temperatures, closer manufacturing tolerances, better inline burner designs, staged combustion, and large frame turbines specifically designed for power generation. However, these energy efficiency improvements may be accompanied by decreasing power output under certain conditions or by increased maintenance frequency which reduces gas turbine availability for online operation. Higher turbine operating temperatures increase the potential for fouling, and this problem is compounded by the tighter tolerances in new high efficiency equipment.

The combustor in a directly-fired gas turbine is less flexible than the combustor in an indirectly-fired gas turbine and can be subject to frequent redesign and repairs in the field. Increased impurity levels in the fuel may cause excessive fouling in the combustor and expansion turbine. Degradation which requires repairs or overhaul to the hot gas path equipment (i.e. the combustor and expansion turbine) is termed "non-recoverable" and can seriously jeopardize a plant's ability to meet long-term contractual obligations. The common practice of injecting steam or water into the combustor to reduce nitrogen oxide emissions and increase turbine power output also reduces the operating life of the hot end equipment.

There is an industry need to improve the availability and prevent degradation of gas turbine systems which are integrated with air separation units while maintaining many of the new advanced gas turbine design features. It is the object of the present invention to improve the availability and reliability of a gas turbine drive for an air separation unit while reducing the cost of producing oxygen by a novel integration of the gas turbine and air separation system.

Figure 1:
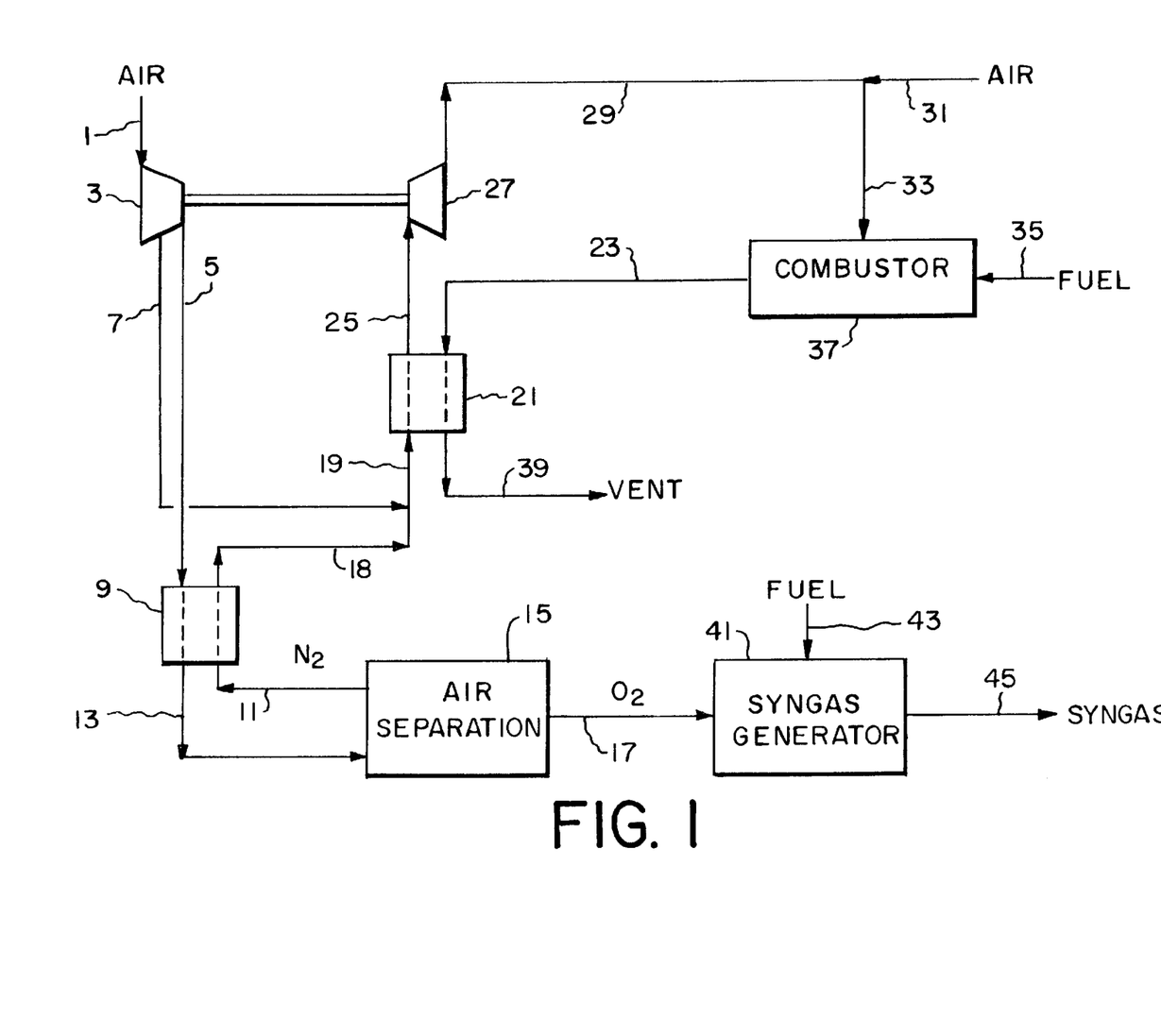
FIG. 1 is a schematic flow diagram of the process of the present invention.

The first embodiment of the present is invention illustrated in FIG. 1 which shows the integration of a gas turbine drive with an elevated pressure air separation unit (ASU). Ambient air in line 1 is compressed in multistage air compressor 3 to provide elevated pressure air in line 5 at 140 to 290 psia from the final compressor stage and medium pressure air in line 7 at 40 to 440 psia from an intermediate compressor stage. Compressor 3 can be an adiabatic or intercooled machine. Elevated pressure air in line 5 at 150 to 1200° F. is cooled in heat exchanger 9 by indirect heat exchange with nitrogen-rich byproduct stream in line 11 (later defined) to yield cooled elevated pressure air feed stream in line 13. This air feed stream is introduced into air separation system 15 which separates the air into an oxygen product in line 17 containing 80 to 99.8 vol % oxygen and byproduct nitrogen in line 11 containing less than 4 vol % oxygen at a pressure in the range of 40 to 440 psia. Byproduct nitrogen in line 11 is heated in heat exchanger 9 as earlier described to provide heated byproduct nitrogen in line 18 which is combined with medium pressure air from line 7 to yield a combined gas stream in line 19. Typically the molar flow ratio of byproduct nitrogen in line 18 to medium pressure air from line 7 is in the range of 1 to 10.

The combined gas stream in line 19 is heated in heat exchanger 21 by indirect heat exchange with hot combustion gas in line 23 (later defined) to yield hot pressurized gas in line 25 at 1150 to 2600° F. and 40 to 440 psia. This hot gas stream is work expanded through gas turbine expander 27 to generate shaft work which is utilized directly to drive mechanically linked multistage air compressor 3. Optionally a portion of this shaft work can be used to drive an electric generator (not shown). Expander exhaust in line 29, which is at near atmospheric pressure and typically contains less than 15 vol % oxygen, is combined with air via line 31 if necessary, and the oxidant gas in line 33 is combusted with fuel from line 35 in combustor 37 to yield hot combustion gas stream in line 23 which heats combined gas stream in line 19 as earlier described. Cooled final exhaust gas in line 39 typically is vented to the atmosphere. Fuel in line 35 can be any gaseous, liquid, or solid carbonaceous fuel.

The hot pressurized gas in line 25, which provides the motive fluid for gas turbine expander 27, typically contains a minimum of 85 vol % nitrogen with the balance being oxygen and argon. Unlike the motive fluid in a direct combustion gas turbine, hot pressurized gas stream in line 25 contains no combustion products, and thus gas turbine expander 27 is not exposed to the carbon dioxide, sulfur oxides, water, and other components present in such combustion products. This is an important advantage of the present invention over integrated gas turbine-air separation systems of the prior art which use directly-fired gas turbines.

The oxygen product in line 17 can be utilized in synthesis gas generator 41 to convert fuel in line 43 to synthesis gas product 4 in line 5 containing hydrogen and carbon monoxide. Fuel in line 43 and fuel in line 35 can be the same, for example natural gas, or can be different carbonaceous components such as liquid hydrocarbons, petroleum residuum, coke, or coal. If desired, synthesis gas in line 45 can be used for fuel in line 35.

Air separation system 15 typically is a cryogenic air separation system of any type known in the art. In this embodiment, air separation system 15 preferably comprises an elevated pressure distillation system which operates in the range of 140 to 490 psia. Nitrogen byproduct in line 11 typically does not require compression prior to combination with the pressurized air stream in line 7. Alternatively, air separation system 15 can utilize a pressure swing adsorption (PSA) process or a ceramic mixed conductor membrane process in conjunction with the indirectly-fired gas turbine system described above. In such embodiments, alternative heat exchange and heat integration steps would be required since PSA processes operate at near ambient temperatures and ceramic mixed conductor membrane processes operate at elevated temperatures. Each of these alternative embodiments, however, would utilize an indirectly-fired gas turbine.

Figure 2:
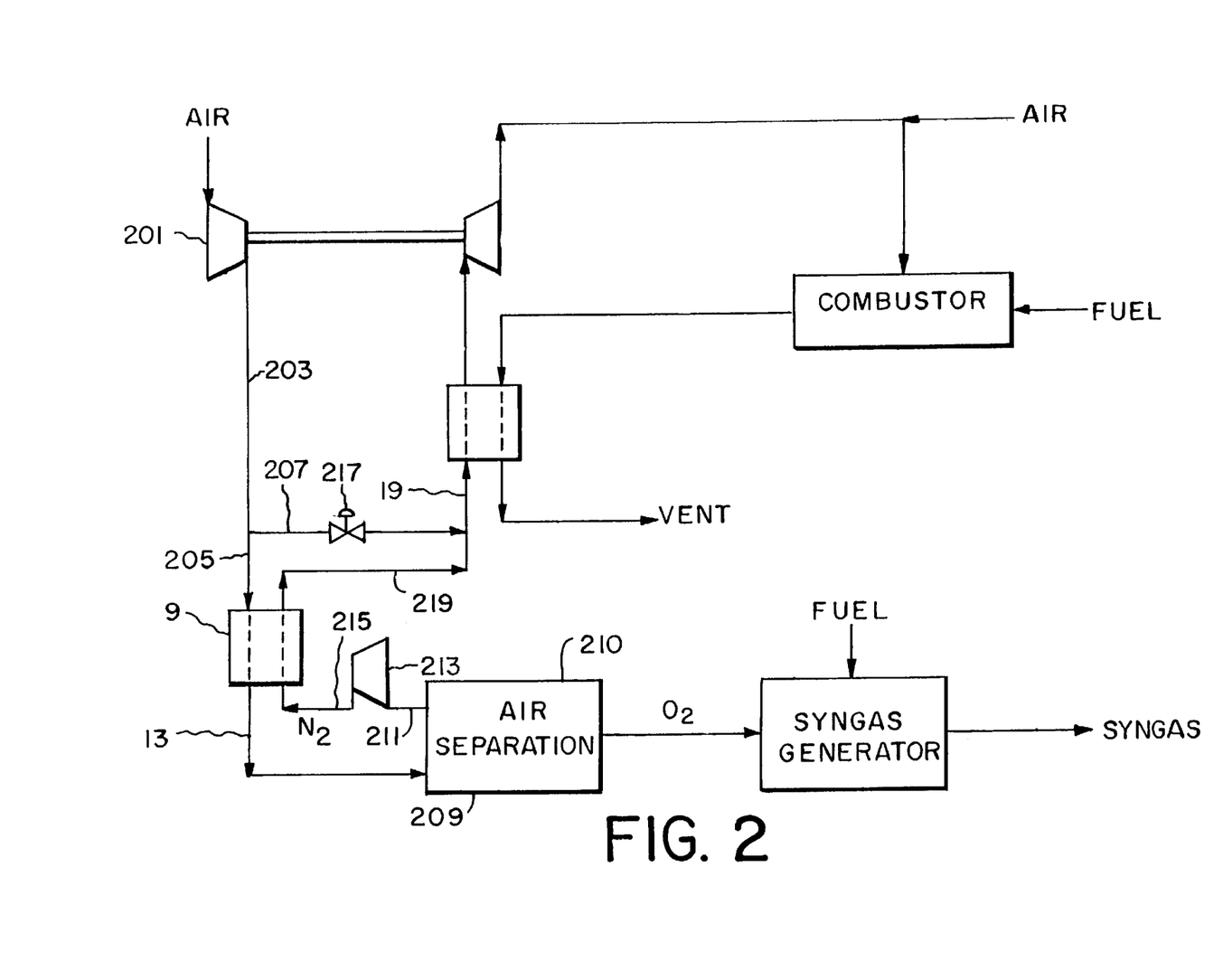
FIG. 2 is a schematic flow diagram for a first alternative process embodiment of the present invention.

An alternative embodiment of the invention is illustrated in FIG. 2 in which the feed air in line I is compressed in compressor 201 to provide pressurized air in line 203 which is divided into separate streams in lines 205 and 207. Pressurized air in line 205 is cooled by indirect heat exchange in heat exchanger 9 to yield cooled pressurized air 13 as earlier described. Air separation system 209 operates at lower pressures than air separation system 15 of FIG. 1, and byproduct nitrogen in line 211 is compressed in nitrogen compressor 213 before heating in heat exchanger 9. Pressurized air in line 207 passes through flow control valve 217 and is combined with heated pressurized nitrogen byproduct in line 219 to provide combined gas stream in line 19, which is heated in heat exchanger 21 as earlier described. The remaining features of the embodiment of FIG. 2 are identical to those of the embodiment of FIG. 1.

Figure 3:
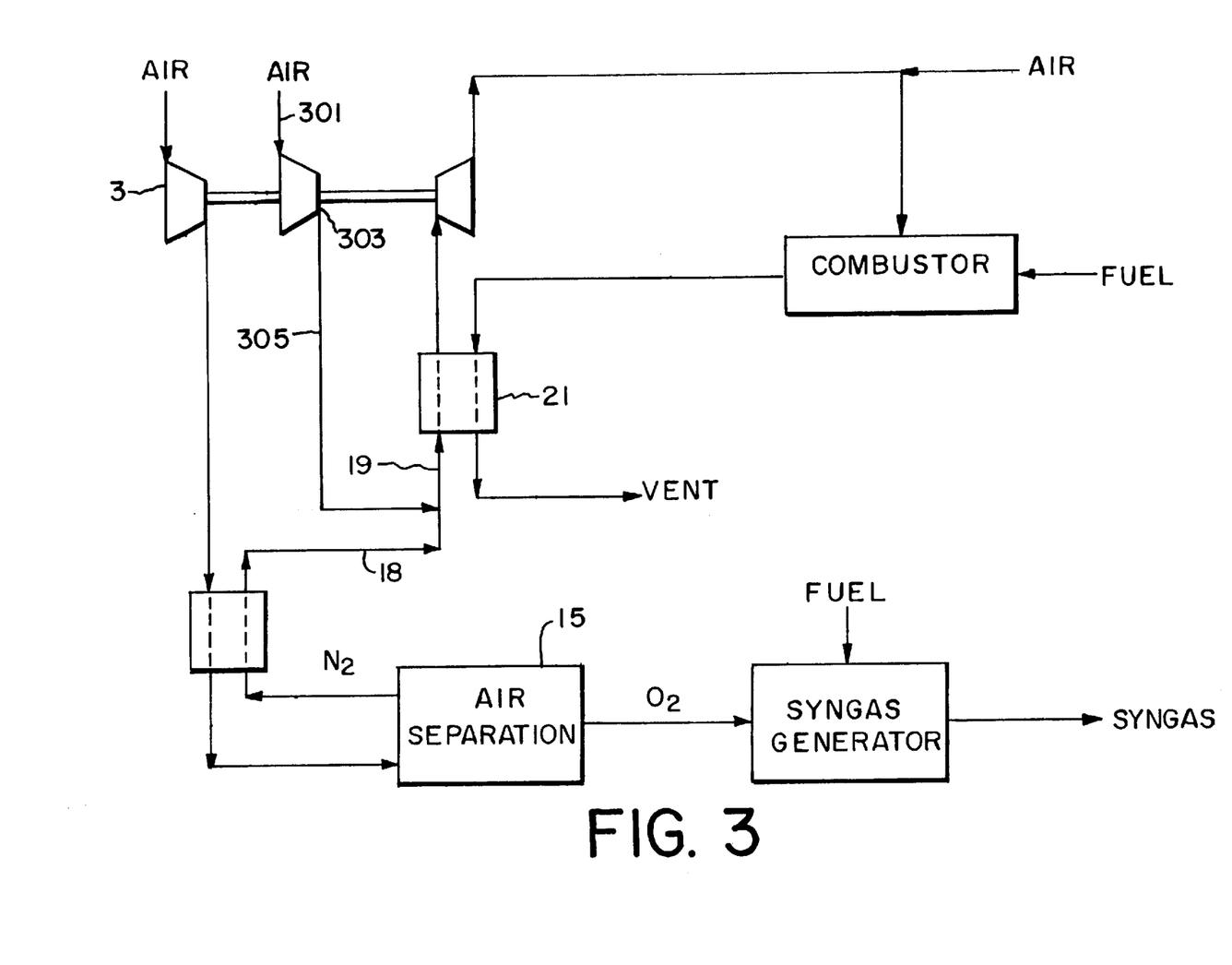
FIG. 3 is a schematic flow diagram for a second alternative process embodiment of the present invention.

Another embodiment of the invention is illustrated in FIG. 3. In this alternative embodiment, air 301 is compressed in compressor 303 to provide pressurized air in line 305 which is combined with byproduct nitrogen from line 18 to provide the combined gas stream in line 19, which is heated in heat exchanger 21 as earlier described. This embodiment separates the compression duty of compressor 3 which provides pressurized air to air separation system 15 from the compression duty of compressor 301 which provides the pressurized air in line 305. Other features of the embodiment of FIG. 3 are identical to those of the embodiment of FIG. 1.

Figure 4:
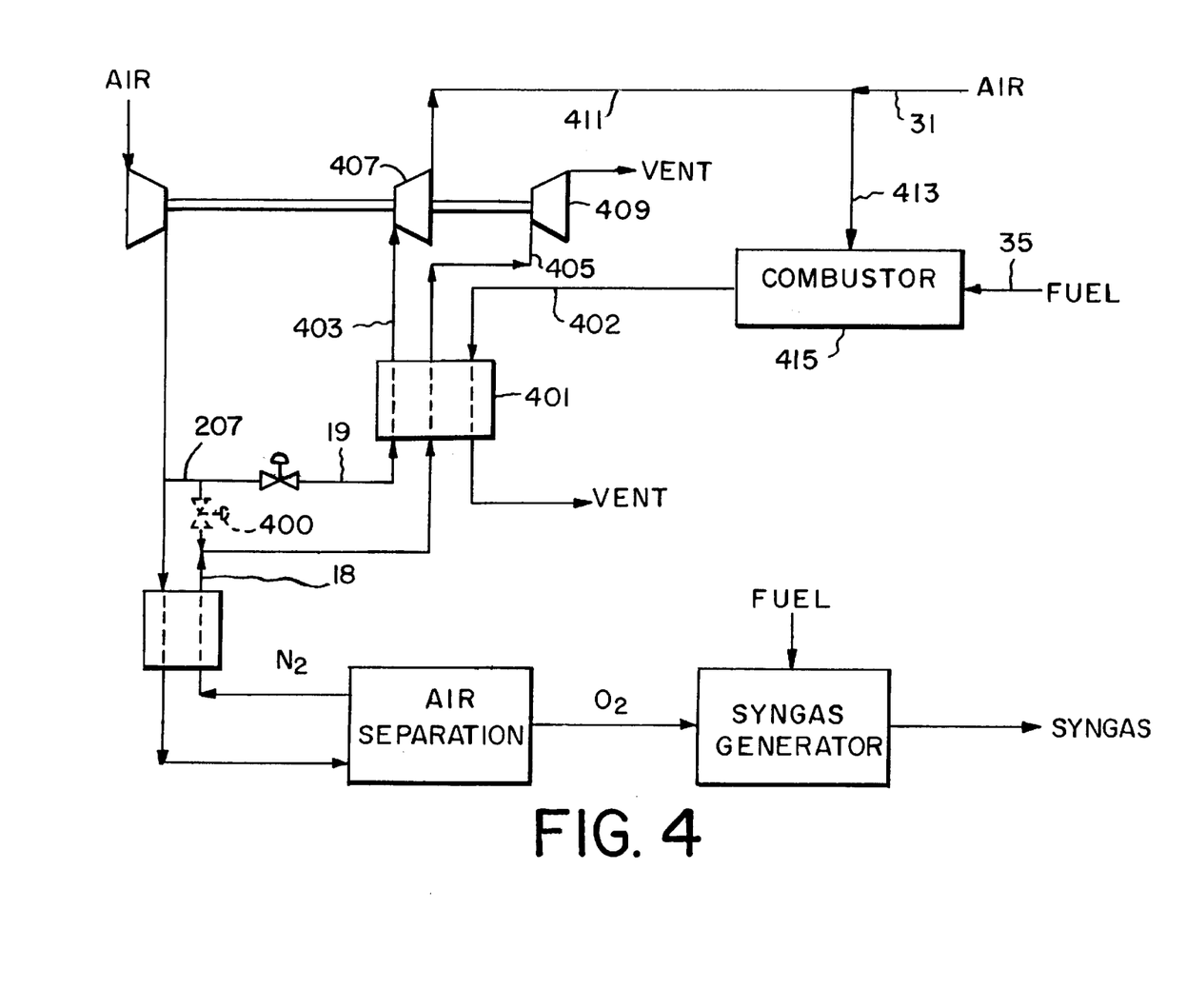
FIG. 4 is a schematic flow diagram for a third alternative process embodiment of the present invention.

Another alternative embodiment of the invention is illustrated in FIG. 4. In this alternative embodiment, the heating and expansion of the nitrogen byproduct in line 18 and the pressurized air in line 19 are carried out separately. The two streams are heated in heat exchanger 401 by indirect heat exchange with a hot combustion gas stream from line 402 to provide a hot pressurized air stream in line 403 and a hot pressurized nitrogen byproduct stream in line 405. If desired, a portion of the pressurized air in line 207 can be introduced through valve 400 and combined with the nitrogen byproduct in line 18. The hot pressurized air and byproduct nitrogen streams are expanded in gas turbine expanders 407 and 409 respectively. Expander exhaust in line 411 optionally is combined with additional air supplied in line 31, and the air stream in line 413 is introduced into combustor 415 to combust fuel 35, thereby generating the hot combustion gas stream in line 402. The embodiment of FIG. 4 is used when a traditional air-based combustion process is preferred in combustor 415. The hot combustion gas stream in line 402 will have a higher excess oxygen than the hot combustion gas stream in line 23 of the previously-described embodiments. Other features of the embodiment of FIG. 4 are identical to those of the embodiment of FIG. 1.

The common element of all embodiments of the invention as described above is the use of an indirectly-heated motive fluid in the gas turbine expander wherein the motive fluid is a combination of pressurized air from the gas turbine compressor and nitrogen-rich byproduct gas from the air separation unit. The hot motive fluid contains no combustion products, and thus gas turbine expander 27 is not exposed to the carbon dioxide, sulfur oxides, water, and other components present in such combustion products. This is an important advantage of the present invention over integrated gas turbine-air separation systems of the prior art.

The availability of a process unit is defined as the percentage of time in a given time period during which the process unit is operational. During the remaining percentage of time, the process unit is shut down for maintenance and repairs. When two or more process units are integrated into an operating system, the overall availability of the system is determined by the lowest availability of the individual process units. It is therefore desirable to improve the performance of the individual unit having the lowest availability in order to improve the overall availability of the integrated operating system.

The availability of a typical cryogenic air separation unit excluding the compressor system is greater than 99%. The availability of a gas turbine is generally lower than that of a cryogenic air separation unit, and so the overall availability of an integrated gas turbine/air separation system will be dictated by the availability of the gas turbine system. An indirectly-fired gas turbine will have a higher availability than a directly-fired gas turbine. Therefore the integrated indirectly-fired gas turbine/air separation system of the present invention will have a higher availability than an integrated directly-fired gas turbine/air separation system of the prior art.

It is important in certain operating situations to maximize the availability of an integrated gas turbine/air separation system, for example situations in which downtime is very expensive and maintenance is difficult. In such situations, the use of an indirectly-fired gas turbine with the air separation system as described by the present invention is preferred over the use of a directly-fired gas turbine.

EXAMPLE 1

Heat and material balances were carried out in a simulation of the integrated gas turbine/air separation system of FIG. 1. The air separation unit is an elevated pressure cryogenic dual-column distillation system as described in U.S. Pat. No. 5,081,845 with an oxygen production capacity of 5000 short tons per day (STPD). The gas turbine unit has a pressure ration of 12.3 to 1 with intermediate air extraction at a pressure ration of 6.6 to 1. Combustor 37 is fired by methane. A summary of the simulation is given in Table 1 for an expansion turbine inlet temperature of 1912° F.

EXAMPLE 2

The simulation of Example 1 was repeated using a cryogenic dual-column distillation system based on the process as described in described in U.S. Pat. No. 5,081,845 but operating with a low pressure air feed and having an oxygen production capacity of 5000 short tons per day (STPD). A summary of the simulation is given in Table 2 for an expansion turbine inlet temperature of 2418° F.

TABLE 1

STREAM SUMMARY FOR EXAMPLE 1
(FIG. 1 WITH AN ELEVATED PRESSURE ASU)

| Stream No. | Temp. (Deg. F.) | Press. (Psia) | Flow (Lbmoles/Hr) | Composition (Mole %) | | | | | |
|---|---|---|---|---|---|---|---|---|---|
| | | | | $N_2$ | Ar | $O_2$ | $CH_4$ | $CO_2$ | $H_2O$ |
| 1 | 59 | 14.7 | 71272 | 77.30 | 0.92 | 20.74 | 0.0 | 0.03 | 1.01 |
| 5 | 213 | 180.0 | 64625 | 77.30 | 0.92 | 20.74 | 0.00 | 0.03 | 1.01 |
| 7 | 218 | 51.0 | 6647 | 77.30 | 0.92 | 20.74 | 0.00 | 0.03 | 1.01 |
| 11 | 60 | 53.0 | 49153 | 97.64 | 0.0 | 0.99 | 0.0 | 0.04 | 1.33 |
| 13 | 118 | 175.0 | 64625 | 77.30 | 0.92 | 20.74 | 0.0 | 0.03 | 1.01 |
| 17 | 60 | 50.0 | 13706 | 95.00 | 3.00 | 2.00 | 0.00 | 0.0 | 0.00 |
| 18 | 190 | 51.0 | 49153 | 97.64 | 0.00 | 0.99 | 0.00 | 0.04 | 1.33 |
| 19 | 193 | 51.0 | 55800 | 95.22 | 0.11 | 3.34 | 0.00 | 0.04 | 1.29 |
| 23 | 2012 | 15.0 | 56704 | 93.73 | 0.11 | 0.10 | 0.00 | 1.60 | 4.46 |
| 25 | 1912 | 50.0 | 55800 | 95.22 | 0.11 | 3.34 | 0.00 | 0.04 | 1.29 |
| 29 | 1368 | 15.0 | 55800 | 95.22 | 0.11 | 3.34 | 0.00 | 0.04 | 1.29 |
| 33 | 1368 | 15.0 | 55800 | 95.22 | 0.11 | 3.34 | 0.00 | 0.04 | 1.29 |
| 35 | 85 | 15.0 | 904 | 0.00 | 0.00 | 0.00 | 100.00 | 0.00 | 0.00 |
| 39 | 369 | 14.7 | 56704 | 93.73 | 0.11 | 0.10 | 0.00 | 1.60 | 4.46 |

TABLE 2

STREAM SUMMARY FOR EXAMPLE 2
(FIG. 2)

| Stream No. | Temp. (Deg. F.) | Press. (Psia) | Flow (Lbmoles/Hr) | Composition (Mole %) | | | | | |
|---|---|---|---|---|---|---|---|---|---|
| | | | | $N_2$ | Ar | $O_2$ | $CH_4$ | $CO_2$ | $H_2O$ |
| 1 | 59 | 14.7 | 76315 | 77.30 | 0.92 | 20.74 | 0.00 | 0.03 | 1.01 |
| 11 | 60 | 90.0 | 16000 | 99.00 | 0.00 | 1.00 | 0.00 | 0.00 | 0.00 |
| 13 | 180 | 95.0 | 64625 | 77.30 | 0.92 | 20.74 | 0.00 | 0.03 | 1.01 |
| 17 | 60 | 18.0 | 13706 | 95.00 | 3.00 | 2.00 | 0.00 | 0.00 | 0.00 |
| 19 | 199 | 88.0 | 27690 | 89.84 | 0.39 | 9.33 | 0.00 | 0.01 | 0.43 |
| 23 | 2518 | 15.0 | 28424 | 87.51 | 0.38 | 3.93 | 0.00 | 2.59 | 5.58 |
| 25 | 2418 | 87.0 | 27690 | 89.84 | 0.39 | 9.33 | 0.00 | 0.01 | 0.43 |
| 29 | 1532 | 15.0 | 27690 | 89.84 | 0.39 | 9.33 | 0.00 | 0.01 | 0.43 |
| 33 | 1532 | 15.0 | 27690 | 89.84 | 0.39 | 9.33 | 0.00 | 0.01 | 0.43 |
| 35 | 85 | 15.0 | 734 | 00.0 | 0.00 | 0.00 | 100.00 | 0.00 | 0.00 |
| 39 | 445 | 14.7 | 28424 | 87.51 | 0.38 | 3.93 | 0.00 | 2.59 | 5.58 |
| 205 | 212 | 97.0 | 76315 | 77.30 | 0.92 | 20.74 | 0.00 | 0.03 | 1.01 |
| 207 | 212 | 97.0 | 11690 | 77.30 | 0.92 | 20.74 | 0.00 | 0.03 | 1.01 |
| 219 | 190 | 88.0 | 16000 | 99.00 | 0.00 | 1.00 | 0.00 | 0.00 | 0.00 |

EXAMPLE 3

The simulation of Example 1 was repeated for other expansion turbine inlet temperatures between 1100° F. and 1900° F. The heat rate, defined as the heat input to the gas turbine combustor (BTU/hr) divided by the gas turbine output at the shaft (KW), was determined for the present invention at various expansion turbine inlet temperatures. The heat rate is a measure of the system efficiency in converting heat energy into mechanical energy having the units of BTU/KWH wherein a lower heat rate corresponds to a higher system efficiency. Heat rates of a standard directly-fired gas turbine system (GE 7FA), for both a simple cycle (without a heat recovery steam generation system and steam turbine) and a combined cycle (with a heat recovery steam generation system and steam turbine) were obtained for comparison with the present invention.

Figure 5:
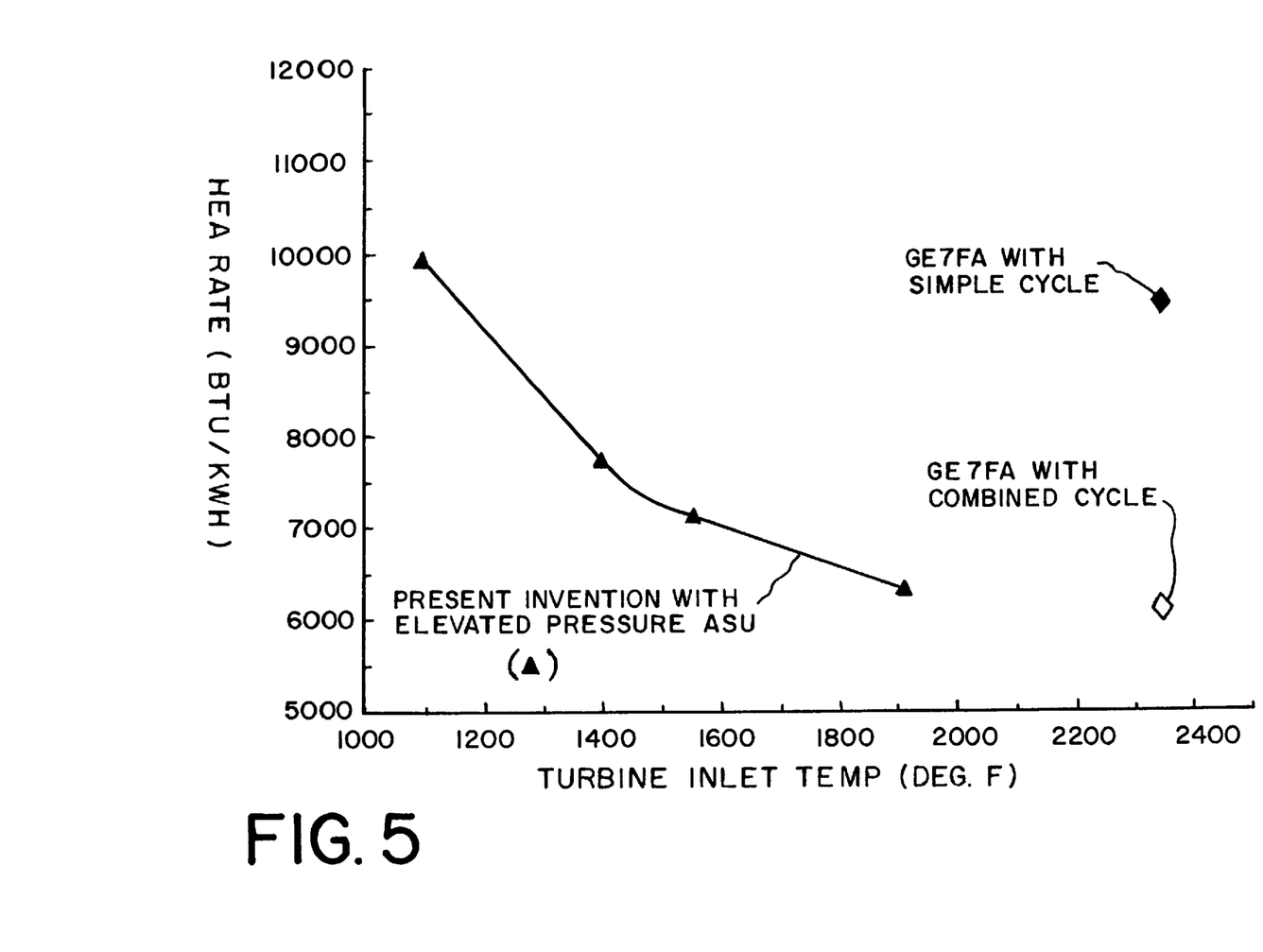
FIG. 5 is a plot of heat rate vs turbine inlet temperature for an embodiment of the present invention.

A plot of heat rate vs turbine inlet temperature for the above information is given in FIG. 5. As the turbine inlet temperature is reduced for the present invention, the heat rate increases and the system efficiency decreases. Lower turbine inlet temperatures are accompanied by less severe operating conditions for heat exchanger 21 of FIG. 1. At temperatures above about 1500° F., ceramic or special metal alloy heat exchanger components typically are required, whereas more conventional materials and heat exchanger designs can be used at lower temperatures. The information plotted on FIG. 5 shows that the system of the present invention compares favorably in heat rate with the conventional directly-fired combined cycle GE 7FA system. While the cycle of the present invention would require a costly ceramic or special alloy metal heat exchanger for heating the turbine inlet gas above about 1500° F., the heat recovery steam generator and steam turbine of the directly-fired combined cycle system would not be required. At lower turbine inlet temperatures, the present invention compares favorably in heat rate with the directly-fired simple cycle GE 7FA system (no steam cycle). In all cases the availability of the system of the present invention would be higher than that of the conventional directly-fired system.

EXAMPLE 4

Figure 6:
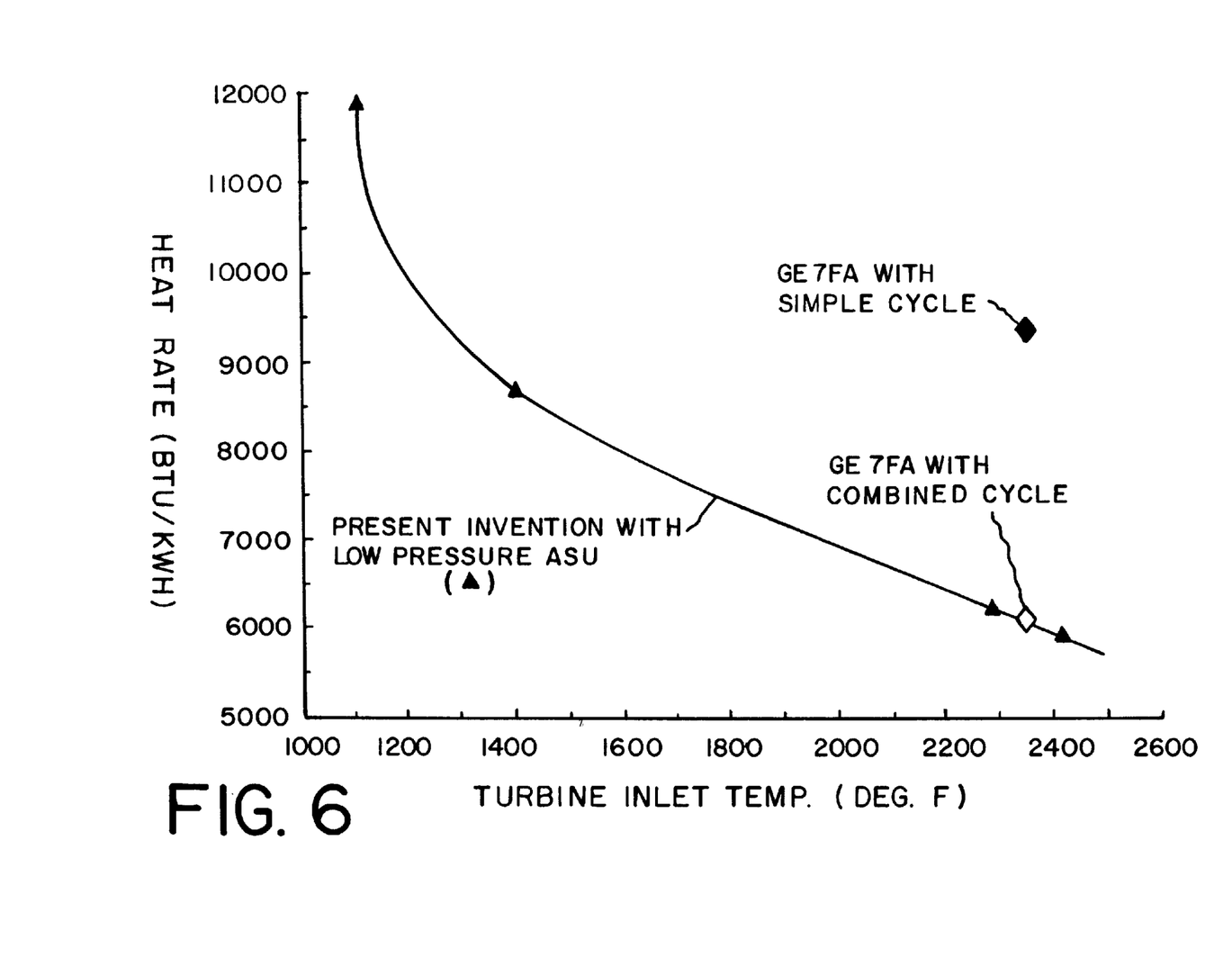
FIG. 6 is a plot of heat rate vs turbine inlet temperature for an alternative embodiment of the present invention.

The comparison of Example 3 was repeated using the low pressure air separation cycle of Example 2, and the results are given in FIG. 6. The heat rate vs turbine inlet temperature plot in this case shows a somewhat less efficient system than that of Example 3, but the conclusions and comparisons of the present invention with the conventional directly-fired gas turbine system are the same.

EXAMPLE 5

Figure 7:
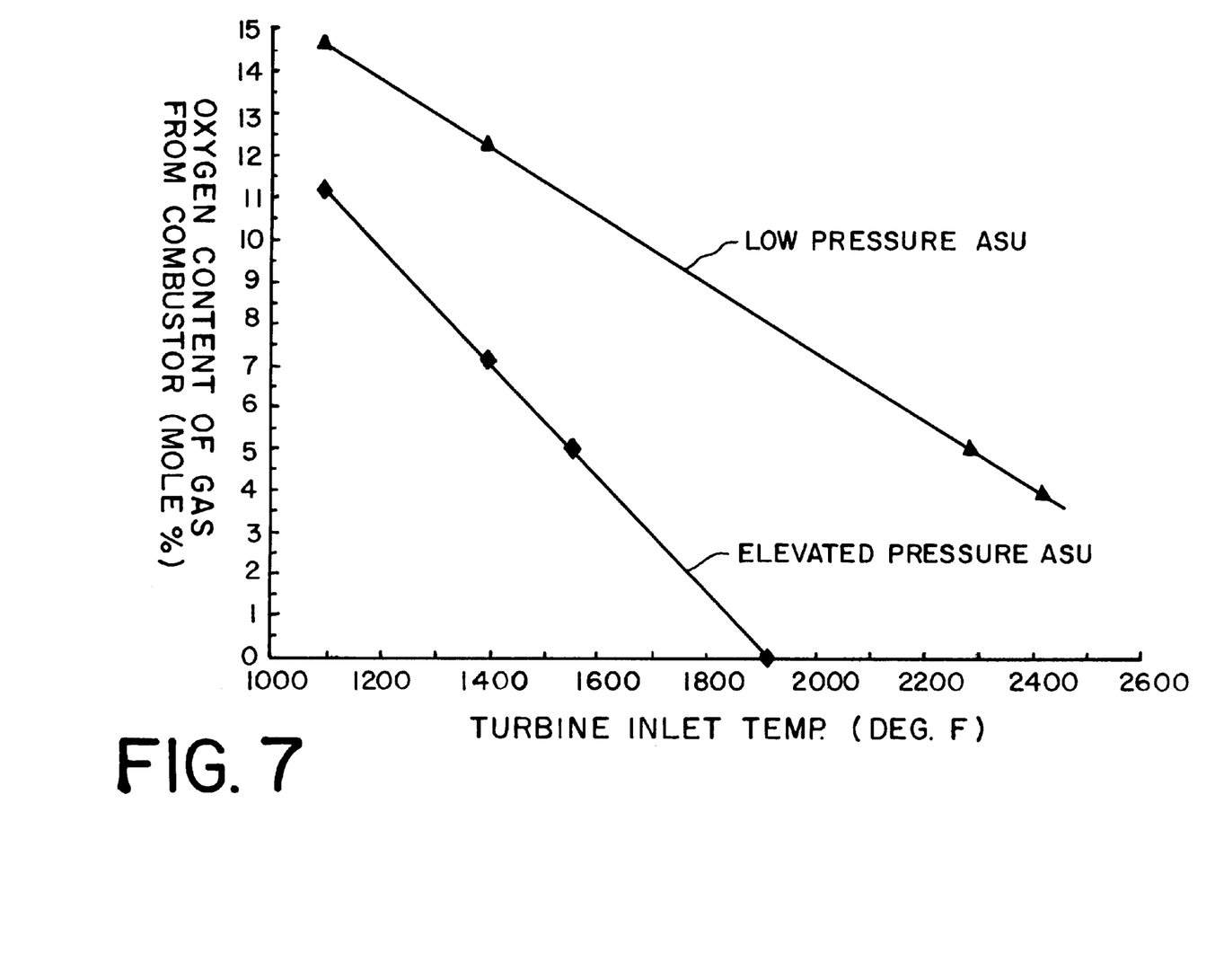
FIG. 7 is a plot of the oxygen content in the gas from the combustor vs the turbine inlet temperature for embodiments of the present invention.

The simulations of Examples 1 and 2 were used to prepare FIG. 7, which is a plot of the oxygen content of the hot combustion gas from combustor 37 (stream 23) vs the expansion turbine inlet temperature (stream 25). A minimum oxygen content in the combustor outlet of about 2 vol % is required to ensure complete combustion of fuel in the combustor. At lower oxygen concentrations, catalytic combustion in combustor 37 would be required. The elevated pressure air separation cycle of Example 1 can be utilized with turbine inlet temperatures up to about 1800° F. without the need for catalytic combustion. The low pressure air separation cycle of Example 2 can be utilized with turbine inlet temperatures up to about 2600° F. without the need for catalytic combustion. FIG. 7 is useful for design purposes when selecting a turbine inlet temperature.

Thus the present invention uses an indirectly-fired gas turbine system to provide compressed air feed for an air separation system in applications where high driver availability is required. The invention integrates an indirectly-fired gas turbine with the air separation system for the production of oxygen with efficient utilization of the nitrogen-rich byproduct as a portion of the indirectly-heated gas turbine motive gas.

The present invention improves the availability and reliability of gas turbine drivers for air separation systems, and is particularly useful in locations where electric drive for the air separation system is not feasible. In such locations, which may be remote from industrially-developed areas and lack reliable electric power grids, this high availability of the integrated gas turbine/air separation system is particularly important. The invention is also useful for very large air separation systems for which standalone electric motors and air compressors are not available.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A method for the production of oxygen which comprises:
   (a) compressing air to provide a first and a second pressurized air stream;
   (b) separating the first pressurized air stream into an oxygen-rich product stream and a nitrogen-rich byproduct stream;
   (c) combining the nitrogen-rich byproduct stream with the second pressurized air stream;
   (d) heating the resulting combined stream of (c) by indirect heat exchange with a hot process stream to provide a hot pressurized gas stream;
   (e) work expanding the hot pressurized gas stream to product shaft work- and a reduced-pressure expander discharge stream, and combusting a fuel with the reduced-pressure expander discharge stream in a combustor to provide the hot process stream of (d); and
   (f) utilizing at least a portion of the shaft work of (e) to provide work for compressing air in (a).

2. The method of claim 1 wherein the first and second pressurized air streams are provided by compressing air and dividing the resulting compressed air stream into the first and a second pressurized air streams.

3. The method of claim 1 wherein the first and second pressurized air streams are obtained by compressing air in a multiple-stage air compressor, withdrawing compressed air from a final stage of the compressor to provide the first pressurized air stream, and withdrawing compressed air from an intermediate stage of the compressor to provide the second pressurized air stream.

4. The method of claim 1 wherein the first and second pressurized air streams are obtained by compressing air in a first air compressor to provide the first pressurized air stream and compressing air in a second air compressor to provide the second pressurized air stream.

5. The method of claim 1 wherein air is added to the reduced-pressure expander discharge stream prior to combustion.

6. The method of claim 1 wherein the oxygen-rich product stream is utilized to gasify a carbonaceous feedstock to produce synthesis gas comprising hydrogen and carbon monoxide.

7. The method of claim 6 wherein a portion of the synthesis gas provides at least a portion of the fuel for the combustor.

8. The method of claim 1 wherein separating the first pressurized air stream into an oxygen-rich product stream and a nitrogen-rich byproduct stream is accomplished by cryogenic distillation.

9. The method of claim 8 wherein the nitrogen-rich byproduct stream is compressed before combining with the second pressurized air stream.

10. The method of claim 1 wherein a portion of the shaft work of (e) is utilized to produce electric power.

11. A method for the production of oxygen which comprises:
   (a) compressing air and dividing the resulting compressed air into a first and a second pressurized air streams;
   (b) separating the first pressurized air stream into an oxygen-rich product stream and a nitrogen-rich byproduct stream;
   (c) heating the second pressurized air stream by indirect heat exchange with a hot process stream and work expanding the resulting heated stream to produce shaft work and a reduced-pressure expander discharge stream;
   (d) heating the nitrogen-rich byproduct stream by indirect heat exchange with a hot process stream and work expanding the resulting heated stream to produce shaft work;
   (e) combusting a fuel with the reduced-pressure expander discharge stream in a combustor to provide the hot process stream of (c) and (d); and
   (f) utilizing at least a portion of the shaft work of (c) or (d) to provide work for compressing air in (a).

12. The method of claim 11 which comprises utilizing at least a portion of the combined shaft work of (c) and (d) to provide work for compressing air in (a).

13. The method of claim 11 wherein air is added to the reduced-pressure expander discharge stream prior to combustion.

14. The method of claim 11 wherein the oxygen-rich product stream is utilized to gasify a carbonaceous feedstock to produce synthesis gas comprising hydrogen and carbon monoxide.

15. The method of claim 14 wherein a portion of the synthesis gas provides at least a portion of the fuel for the combustor.

16. The method of claim 11 wherein the heating in (c) and (d) is accomplished by common indirect heat exchange with the hot process stream.

17. The method of claim 11 wherein separating the first pressurized air stream into an oxygen-rich product stream and a nitrogen-rich byproduct stream is accomplished by cryogenic distillation.

18. The method of claim 17 wherein the nitrogen-rich byproduct stream is compressed before combining with the second pressurized air stream.

19. The method of claim 11 wherein a portion of the shaft work of (c) or (d) is utilized to produce electric power.

* * * * *

UNITED STATES PATENT AND TRADEMARK OFFICE
CERTIFICATE OF CORRECTION

PATENT NO. : 5,979,183
DATED : 11/09/99
INVENTOR(S) : A. R. Smith et al.

It is certified that error appears in the above-identified patent and that said Letters Patent are hereby corrected as shown below:

page 10, line 19, delete "290" and replace with --490--.

Signed and Sealed this

Tenth Day of April, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO.    : 5,979,183
DATED         : November 9, 1999
INVENTOR(S)   : A. R. Smith et al.

Page 1 of 1

It is certified that error appears in the above-identified patent and that said Letters Patent is hereby corrected as shown below:

<u>Column 6,</u>
Line 16, delete "290" and replace with -- 490 --.

Signed and Sealed this

First Day of January, 2002

Attest:

Attesting Officer

JAMES E. ROGAN
*Director of the United States Patent and Trademark Office*